(12) United States Patent
Mancini et al.

(10) Patent No.: US 11,129,450 B1
(45) Date of Patent: Sep. 28, 2021

(54) RIGID WAVE INTERLOCKING FASTENER SYSTEM

(71) Applicant: SKYLIE PTY LTD, Cleveland (AU)

(72) Inventors: Bradley Michael Mancini, Cleveland (AU); Tom Marek Mancini, Cleveland (AU)

(73) Assignee: Skylie Pty. Ltd., Cleveland (AU)

( * ) Notice: Subject to any disclaimer, the term of this patent is extended or adjusted under 35 U.S.C. 154(b) by 0 days.

(21) Appl. No.: 16/899,282

(22) Filed: Jun. 11, 2020

(51) Int. Cl.
  *A44B 11/25* (2006.01)
  *A43C 11/00* (2006.01)
  *A47G 1/16* (2006.01)
  *F16M 13/02* (2006.01)

(52) U.S. Cl.
  CPC .......... *A44B 11/258* (2013.01); *A43C 11/008* (2013.01); *A47G 1/1606* (2013.01); *F16M 13/02* (2013.01)

(58) Field of Classification Search
  CPC ... A44B 11/258; A43C 11/008; A47G 1/1606; F16M 13/02
  USPC .................................................. 24/306, 452
  See application file for complete search history.

(56) References Cited

U.S. PATENT DOCUMENTS

| | | | | |
|---|---|---|---|---|
| 4,183,121 A | * | 1/1980 | Cousins | A44B 13/0023 24/588.1 |
| 4,794,674 A | * | 1/1989 | Mintel | A43C 11/14 24/712.1 |
| 5,555,608 A | * | 9/1996 | Allan | A43B 11/00 24/16 PB |
| 5,640,744 A | * | 6/1997 | Allan | A43B 11/00 24/306 |
| 5,983,467 A | * | 11/1999 | Duffy | A44B 18/0046 24/442 |
| 9,700,097 B2 | * | 7/2017 | McCleary | A43B 3/126 |
| 9,700,102 B2 | * | 7/2017 | McCleary | A43C 11/22 |
| 2010/0071230 A1 | * | 3/2010 | Hassid | A43C 11/14 36/54 |
| 2015/0305432 A1 | * | 10/2015 | Wiens | A43B 1/0054 36/97 |
| 2018/0192745 A1 | * | 7/2018 | McDaniel | F16G 11/14 |

* cited by examiner

*Primary Examiner* — Robert Sandy
*Assistant Examiner* — Louis A Mercado
(74) *Attorney, Agent, or Firm* — Eric Karich; Karich & Associates

(57) ABSTRACT

An interlocking fastening device includes two solid interlocking forms that can be quickly and easily locked when placed together. The two forms are held together by tension forces and resist these same tension forces to create a locking mechanism. Each interlocking form is made up of rigid three-dimensional wave formations that taper upwardly at an acute angle from a guide plate. When bringing the two rigid interlocking forms together they self-align to provide a rigid, strong, low-profile, thin, low-wear, locking, mechanism.

4 Claims, 7 Drawing Sheets

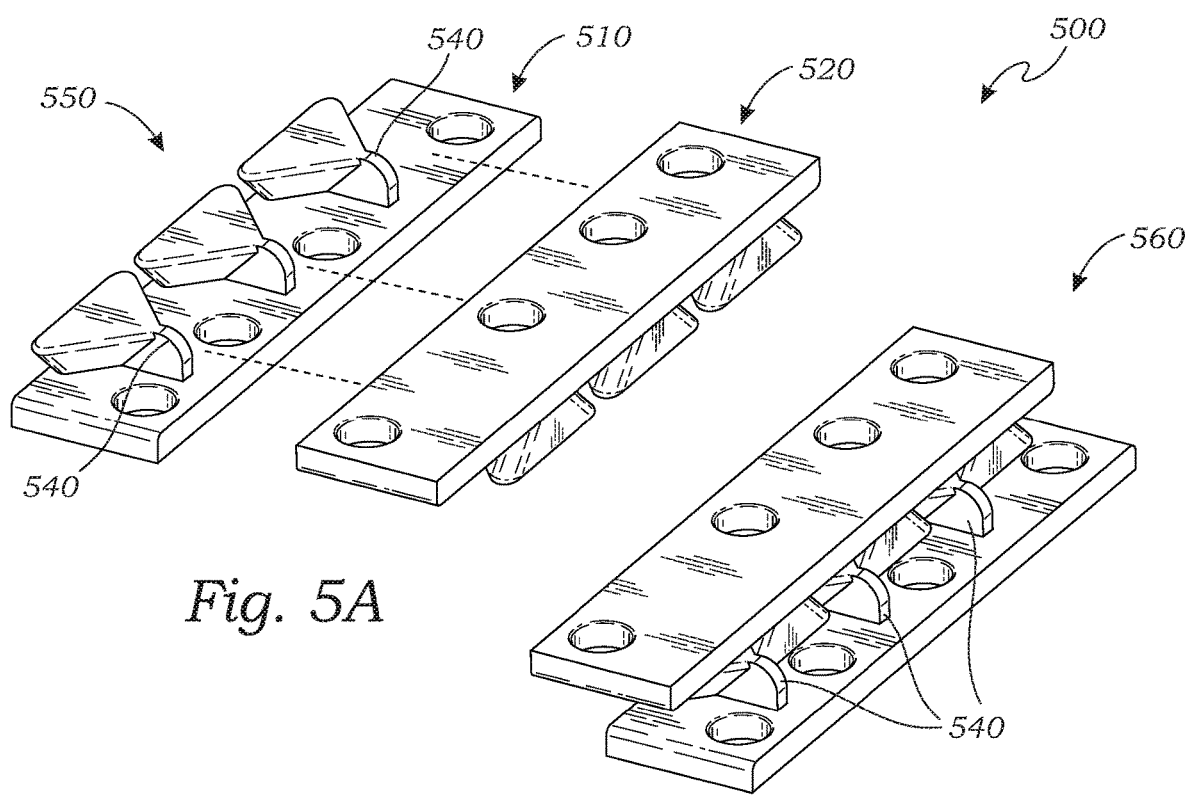
Fig. 5A
Fig. 5B
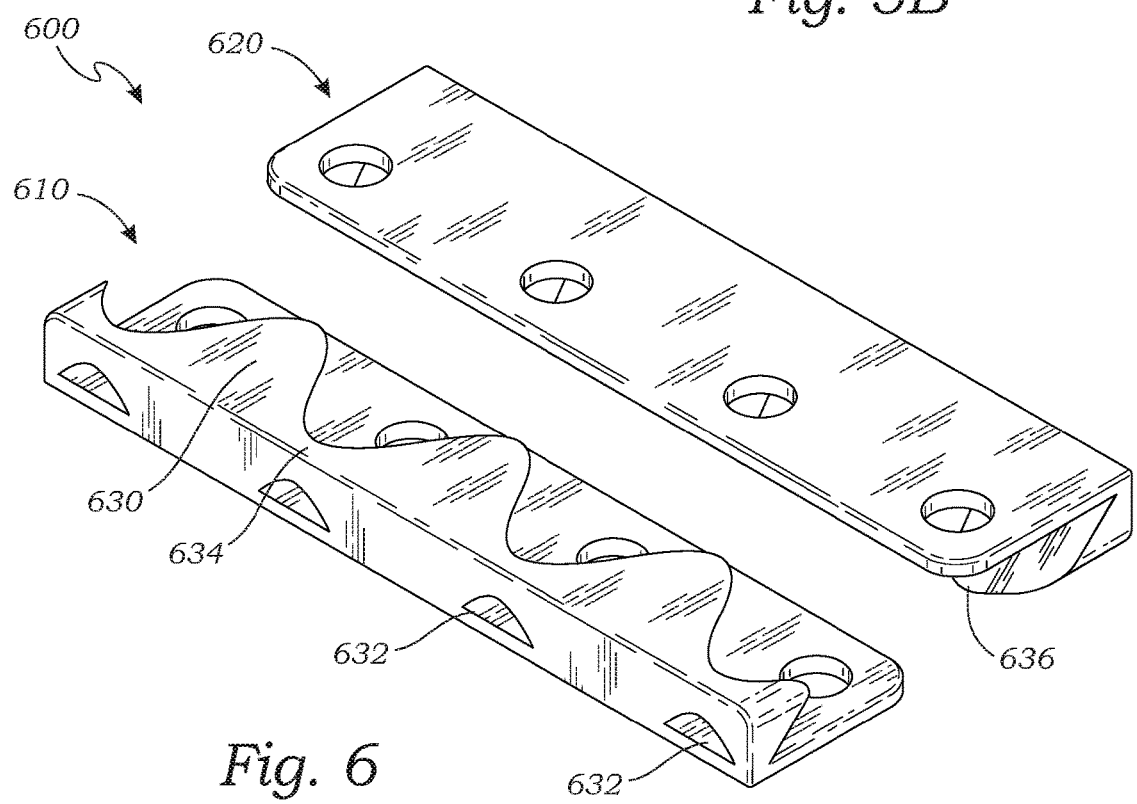
Fig. 6

RIGID WAVE INTERLOCKING FASTENER SYSTEM

BACKGROUND OF THE INVENTION

Field of the Invention

This invention relates generally to mechanical fastening devices, in particular those used for connecting a wide variety of rigid or flexible materials. The present invention provides two solid interlocking forms that can be quickly and easily locked in place when placed together.

Description of Related Art

Devices which interconnect two surfaces by use of inter-digitated parts are very useful. Slide fasteners, hook and loop devices, other press together systems, and various forms of interlocking longitudinal shapes such as those used in plastic food storage bags are commonly utilized for attaching flexible materials. Rigid materials are sometimes connected by various types of interlocking joints, such as the dovetail joint common to woodworking. Fastening flexible materials such as apparel, fabric, leather, rubber, plastics, or other flexible sheet goods the zipper is probably the most common means in use today.

Duffy, U.S. Pat. No. 5,983,467 teaches an interlocking device having a plurality of islands on a first surface, which, when relative force is applied, slidingly engage complimentary apertures on a second surface. In one embodiment the islands are positioned in a geometric array, the islands having top surfaces with perimeters to approximate triangular shapes in plan view. MO sidewalk of which are undercut to provide an angle with the first surface. The first and second surfaces are interlocked by a relative shearing force in a single direction such that each island fills each aperture formed by its opposites. In some embodiments, the islands are more curvilinear in design.

Cousins, U.S. Pat. No. 4,183,121, teaches a fastener that includes two opposed mating strips having a series of inter-engaging tongues offset from and in parallel alignment with one of the axes of the strips, which overlap openings in the strips.

Wiens, U.S. 20150305432, teaches a magnetic footwear fastener including a pair of magnetic couplers that are selectively (magnetically) coupled together, such as to selectively secure footwear in a closed, or sized, configuration around a wearer's foot. The magnetic couplers may also include coupler eyelets through which the footwear's lace extends. When the magnetic couplers are permanently coupled to the footwear, the mechanical coupling regions thereof may be integrated into the shell, tongue, vamp, or other upper region of the footwear.

But prior art, fasteners have a host of disadvantages and for most applications they cannot readily be made of inexpensive materials, and a highly precise capital-intensive manufacturing system is necessary. Hook and loop systems such as Velcro also have some of the same disadvantages and although they may perform well under some horizontal shear stress of the joint, they tend to perform less well under vertical tension.

There is a need for an interlocking device and fastener system which provides simplicity, functional strength unrelated to the force necessary for disconnection, means of maintaining engagement, self-alignment, minimal visibility, ease of manufacture, multiplicity of function, among other advantages. The present invention fulfills these needs and provides further advantages as described in the following summary.

SUMMARY OF THE INVENTION

The present invention teaches certain benefits in construction and use which give rise to the objectives described below. The present, invention provides an interlocking fastening device comprising two solid interlocking forms that can be quickly and easily locked when placed together. The two forms are held together by tension forces and resist these same tension forces to create a locking mechanism. These interlocking forms are made up of rigid three-dimensional wave formations. When bringing the two rigid interlocking forms together they self-align to provide a rigid, strong, low-profile, thin, low-wear, locking mechanism. The two wave forms extend upwards at an angle from their corresponding flat guide plates.

When looking from above, the shape of the wave forms may be either 1. a sinusoidal, or 2. a triangle wave, or 3. a combination of sinusoidal and triangle waves, in some embodiments. In other embodiments, other shapes may be used. The tips of the waves may pass through corresponding holes in the opposing form so that the combined size when the forms are brought together in closed position is significantly reduced.

A primary objective of the present invention is to provide an interlocking fastening system not taught in the prior art.

Another objective is to provide an interlocking fastening system that includes a simple mechanism to securely and precisely join two objects or two parts of a system that will remain under tension. This new locking design allows for quick and easy attaching and detaching of any device or mechanism that is designed to be held under tension under normal operation.

Another objective is to provide an interlocking device that includes guide plates that complement the wave forms to assist in alignment when engaging, and which maintain the device in the locked position to prevent disengagement.

Another objective is to provide an interlocking device wherein tips of the wave forms can extend through apertures or openings formed in the opposite wave forms.

Another objective is to provide an interlocking device that are self-aligning, self-leveling, and which form a secure interlock as long as the components remain under tension.

Another objective is to provide an interlocking device that provides an even distribution of forces under various angles to preserve structural integrity of the entire form and maximize strength under load, providing a high strength-to-size ratio.

Another objective is to provide an interlocking device that resists movement while under tension, thereby minimizing abrasion and wear.

Another objective is to provide an interlocking device having means to retain the portions in a pre-engaged position resistant to disconnection.

Another objective is to provide an interlocking device which may be furnished in a mating configuration. In general, the present device provides a simple, structurally sound connection which is easy to operate, which may be readily manufactured of a wide range of materials, and which may be varied in design to meet specific aesthetic or functional constraints. In its various embodiments it may be provided to connect flexible materials, rigid materials, or a rigid to a flexible material.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The present invention is illustrated schematically in the following drawings which are intended to demonstrate a wide range of possible embodiments and combinations thereof. Each embodiment therefore illustrates certain aspects of the invention which may be combined in diverse configurations with those illustrated in other embodiments.

FIG. 5A is an exploded perspective view of another embodiment of the invention showing perpendicular guides at the apex of rigid waves instead of bridges with guiding plates in open and closed positions.

FIG. 5B is a perspective view thereof illustrating the guides once they have been interlocked.

FIG. 6 is an example of an additional embodiment of the invention showing symmetric rigid sinusoidal waves with bridge and guiding plate in open position.

DETAILED DESCRIPTION OF THE INVENTION

The above-described drawing figures illustrate the invention, an interlocking fastening device with a general wave shape. Various embodiments of the interlocking fastening device are described herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects of the present invention.

Figure 1:
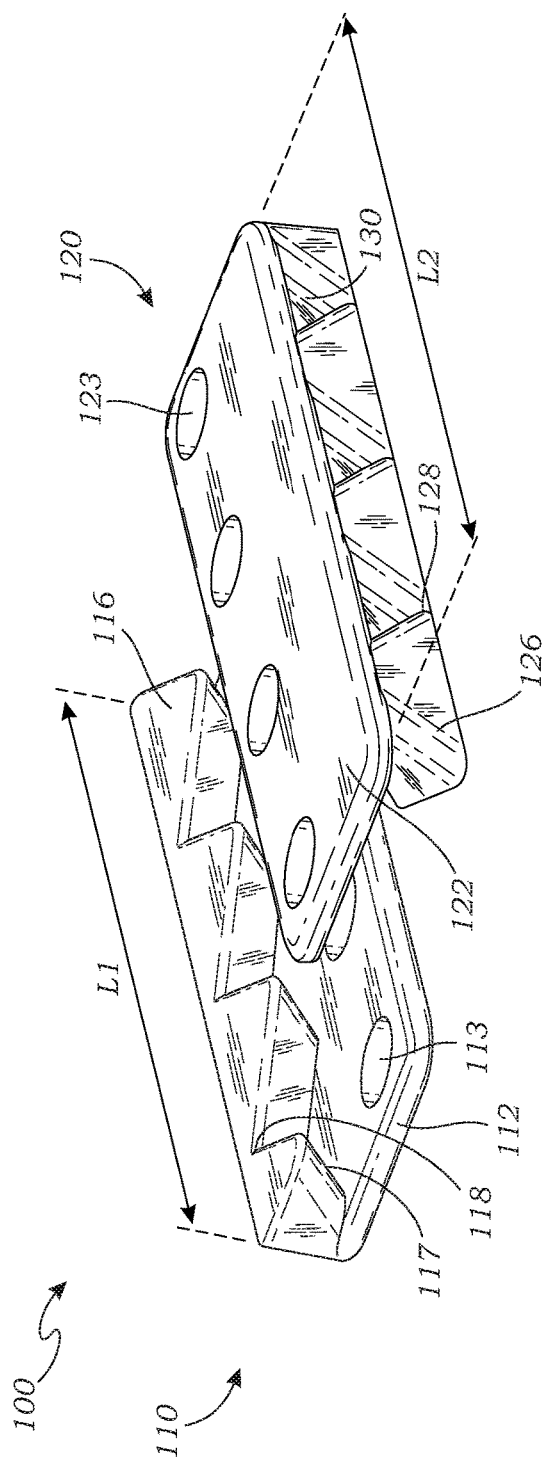
FIG. 1 is an illustration of an example of a first embodiment of the invention showing symmetric rigid triangular waves with bridge and guiding plate in open position.

FIG. 1 is an illustration of an example of a first embodiment of the invention showing a device with symmetric rigid triangular wave structures with bridge and guiding plate in open position. This is one example of a device that uses two three-dimensional wave like structures that taper up at an angle from a guide plate with a bridge connecting the wave like structures that allows opposing like pieces to enter and partially go through each other to create a low-profile combined structure with strong and stable hold when under tension.

In some embodiments, the wave structures are continuous; however, in alternative embodiments, the wave structures may be broken in places.

As shown in FIG. 1, device 100 comprises two interlocking portions, a first interlocking portion 110 and a second interlocking portion 120. First interlocking portion 110 has first guide plate 112 and second interlocking portion 120 has second guide plate 122. The guide plates 112 and 122 may include a mounting structure 123, in this case a plurality of apertures laterally spaced across the longitudinal length of the plates, for receiving fasteners (e.g., screw, etc.) therethrough for mounting the fasteners on other objects, as described in greater detail below. In alternative embodiments, the mounting structures 123 may include other forms of mechanical fastening systems, rope, wire, bolts, chemical/adhesives, or other fastening systems or devices known in the art.

The first interlocking portion 110 has at least one, in this case a plurality, of structures 116 which extend upwardly from the surface of guide plate 112 and are arrayed along its longitudinal length L1. The structures 116, which may be in the form of a mesa or similar shape, form a first curvilinear wave structure with front facing edges 117 that taper upwardly at an acute angle from the surface of first guide plate 112 to form bridge points. Interlocking portion 120 has at least one, in this case a plurality, of mesa structures 126 which extend upwardly (downwardly as illustrated) from the surface of guide plate 122 and are arrayed along its longitudinal length L2. Mesa structures 126 form a second curvilinear wave structure with front facing edges that taper upwardly at an acute angle from the surface of first guide plate 122 to form bridge points. Bridge points 128 form openings or apertures 130 in interlocking portion 120 and bridge points 118 form similar apertures in interlocking portion 110 which are not shown in the figure in order to improve clarity. The two curvilinear wave structures formed by mesa structures 116 and 126 and their forward-facing edges each form forward facing wave patterns.

Figure 2:
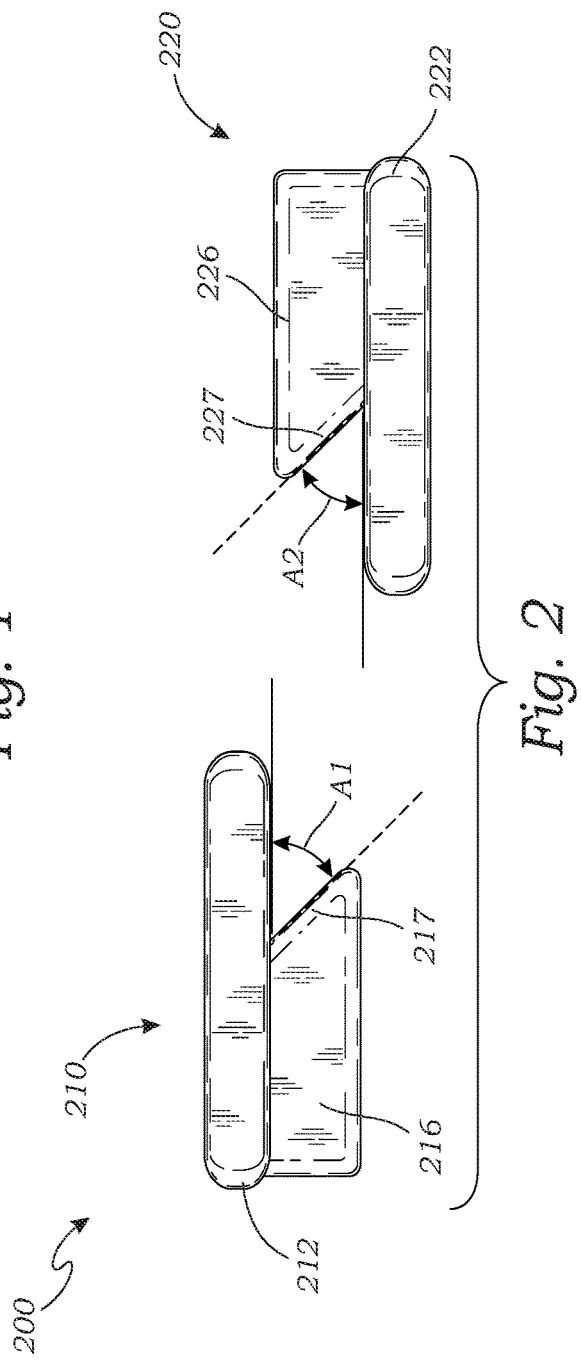
FIG. 2 is a side elevation view of the first embodiment of the invention showing symmetric rigid triangular waves with bridge and guiding plate in open position.

FIG. 2 is a side elevation view of the first embodiment of the invention, device 100, shown in FIG. 1. As shown in FIG. 2, device 200 comprises two interlocking portions, first interlocking portion 210 and second interlocking portion 220. First interlocking portion 210 has first guide plate 212 and second interlocking portion 220 has second guide plate 222. Interlocking portion 210 has at least one, in this case a plurality, of mesa structures 216 which extend upwardly (downward as illustrated) from the surface of guide plate 212. Mesa structures 216 form a first curvilinear wave structure with front facing edges 217 that taper upwardly (downward as illustrated) at a first angle A1 from the surface of first guide plate 212. Interlocking portion 220 has a at least one, in this case a plurality, of structures 226 which extend upwardly from the surface of guide plate 222. The structures 226 may be in the form of a mesa or similar structure, and may form a second curvilinear wave structure with front facing edges 227 that taper upwardly such that a second angle A2. This angle A2 is an acute angle relative to the surface of second guide plate 222.

The angles A1 and A2 may be acute angles from 1-89 degrees. Generally, the angles A1 and A2 will be between 30-60 degrees however. The angles between the mesa structures and their corresponding guide plates, A1 and A2, are identical so that they engage each other when the front facing edges 217 abut, the front facing edges 227. Once seated, substantially all of the front facing edges 217 and 227 should contact each other, providing a superior hold. In this embodiment, the angles A1 and A2 are each approximately 45 degrees, and may be exactly 45 degrees (within suitable tolerances which may be determined by one skilled in the art).

Figure 3:
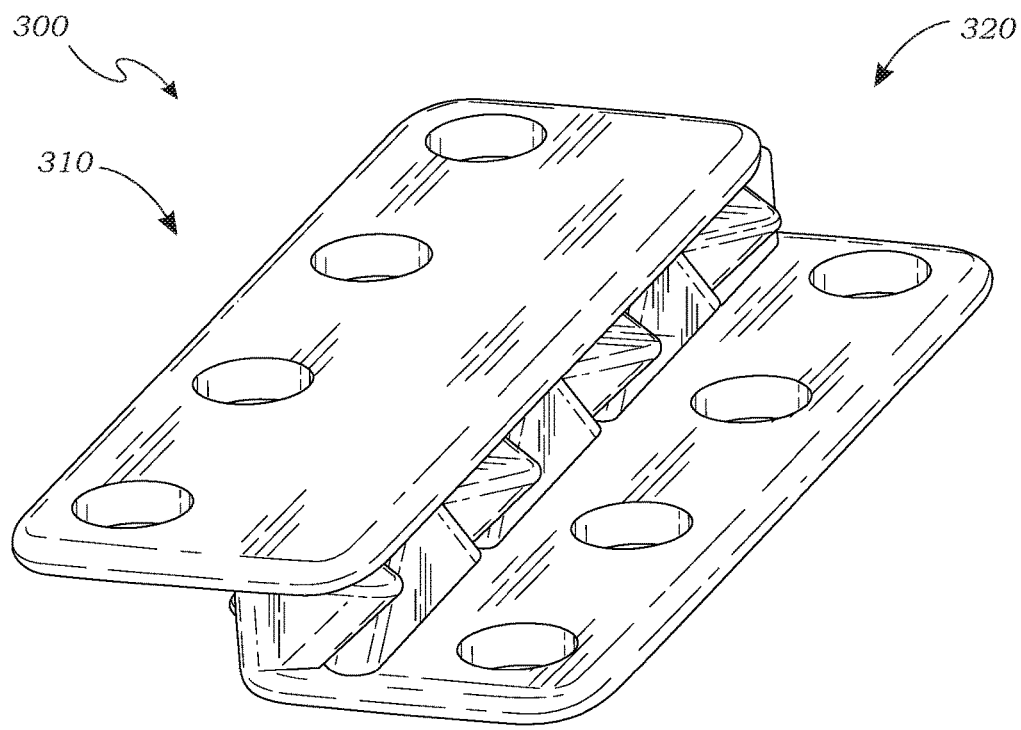
FIG. 3 is an illustration of the first embodiment of the invention showing symmetric rigid triangular waves with bridge and guiding plate in closed position.

FIG. 3 is an illustration of the first embodiment of the invention, device 100, shown in FIG. 1, showing symmetric rigid triangular waves with bridge and guiding plate in a closed position. Interlocking portion 310 is shown in interlocked position with interlocking portion 320.

FIG. 3 illustrates device 300 with interlocking portion 310 and interlocking portion 320 positioned and configured so that the curvilinear wave structure of interlocking portion 310 is received in between and extends beyond the curvilinear wave structure of interlocking portion 320.

Figure 4:
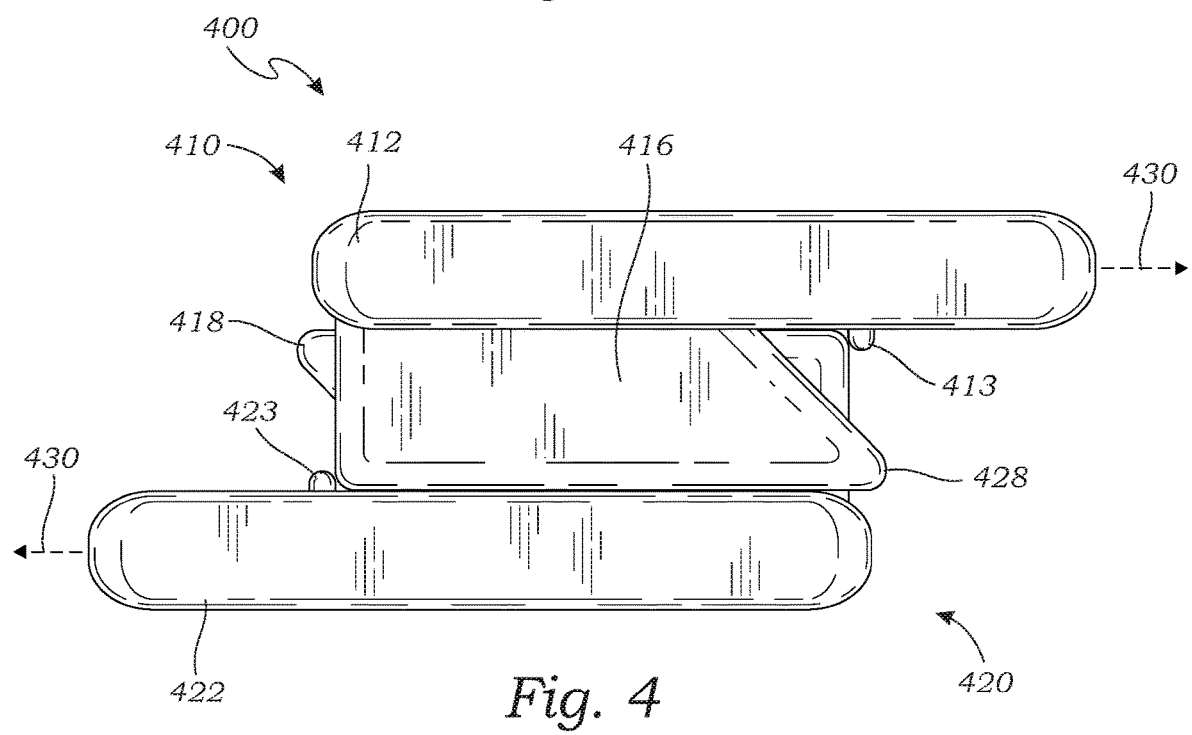
FIG. 4 is a cross section of the first embodiment of the invention showing symmetric rigid triangular waves with bridge and guiding plate in closed position.

FIG. 4 is a cross section of the first embodiment of the invention, device 100, shown in FIG. 1, but in closed position as illustrated in FIG. 3. In FIG. 4 device 400 comprises two interlocking portions, first interlocking portion 410 and second interlocking portion 420. First interlocking portion 410 has first guide plate 412 and second interlocking portion 420 has second guide plate 422. Interlocking portion 410 has at least one, in this case a plurality, of mesa structures 416. Mesa structures 416 form a first curvilinear wave structure with front facing edges. As previously described guide plate 420 has similar mesa structures forming, a like second curvilinear wave structure with front facing edges. FIG. 4 illustrates interlocking portion 410 being positioned and configured so that its curvilinear wave structure is received in between and, extends beyond the curvilinear wave structure of interlocking portion 420. The extension beyond the curvilinear wave structures is illustrated by extensions 418 and 428. The extensions employed in the invented device are a unique feature among locking mechanisms and they provide for the interlocking device to have a smaller footprint or smaller size in general compared to prior art locking and fastening mechanisms. The device bridges and guide plates enable the extensions and thus enable the unique feature among locking and fastening mechanisms.

FIG. 4 also illustrates that the application of relative tension force 430 to interlocking portions 410 and 420 causes their pluralities of forward facing sidewalls to slidingly engage until those forward facing sidewalls engage sufficiently to block further movement in the direction of the relative tension force on interlocking portions 410 and 420. By design, forces between the two elements of the wave interlocking device are distributed across a large surface area between the rigid components. This force distribution along the opposing angled faces and guiding plates helps to self-align and guide the elements when closing the device. This also serves to hold the elements in a stable locked position when held under tension. Due to the angles A1 and A2 of the opposing faces together with the guiding plates, the device can support tension forces in a range of directions and angles whilst remaining in a locked position.

As shown in FIG. 4, the device 400 may further include one or more first protrusion(s) 413 extending upwardly from the first guide plate 412, positioned to lock the interlocking portions 410 and 420 in place relative to one another. Similarly, second protrusions 423 extend upwardly from the second guide plate 422 for similarly locking the device 400 in the interlocked configuration.

FIG. 5A is an exploded perspective view of another embodiment 500 of the invention showing, perpendicular guides 540 at the apex of rigid waves instead of bridges with guiding plates in open and closed positions. FIG. 5B is a perspective view thereof illustrating the guides 540 once they have been interlocked. As shown in FIGS. 5A and 5B, the invention may include perpendicular guides at the apex of rigid waves instead of bridges with guiding plates in open and closed positions. FIGS. 5A and 5B illustrate interlocking fastening device with portions 510 and 520 shown in open or disengaged position 550 and closed or engaged position 560. Perpendicular guides 540 add, stability and strength to the wave structure tips. They also serve to align the portions when engaging. The length of perpendicular guides 540 can be adapted to suit the intended application. The perpendicular guides and the tips of the wave structures on one portion protrude through the back of the opposing portion to reduce the overall width when in closed position. The acute angle between the wave structure formations and the guide plates create a wedge that lock the opposing portions into place when held under tension force on and within the plane of the portions.

FIG. 6 is an example of an additional embodiment 600 of the invention showing symmetric rigid sinusoidal waves with bridge and guiding plate of portions 610 and 620 in open position. Whereas the embodiment 100 shown in FIG. 1 comprises raised structures similar to triangular features with bridge portions, the embodiment 600 comprises raised features and bridges that form sinusoidal waves 630. Apertures 632 allow opposing wave tips 636 to extend through the raised structures, allowing the two elements 610 and 620 to link closer together to form a very thin and low-profile locking system. The tops 636 also function to push out any debris when closing, so they are self-cleaning.

Other embodiments of the invented interlocking fastening device are envisioned wherein the first and second curvilinear structures take the shape of not only a sinusoidal wave or triangle wave but also a combination of both sinusoidal and triangle waves. Alternatively, other shapes that can be approximated mathematically using Fourier Series could also be used. Gaps or straight lines between wave elements could be added. The curvilinear structures can be chamfered or fileted to remove sharp edges. The first and second portions as described in this application can be exact replicas of each other in practice which lowers production costs and reduces inventory.

Figure 7A:
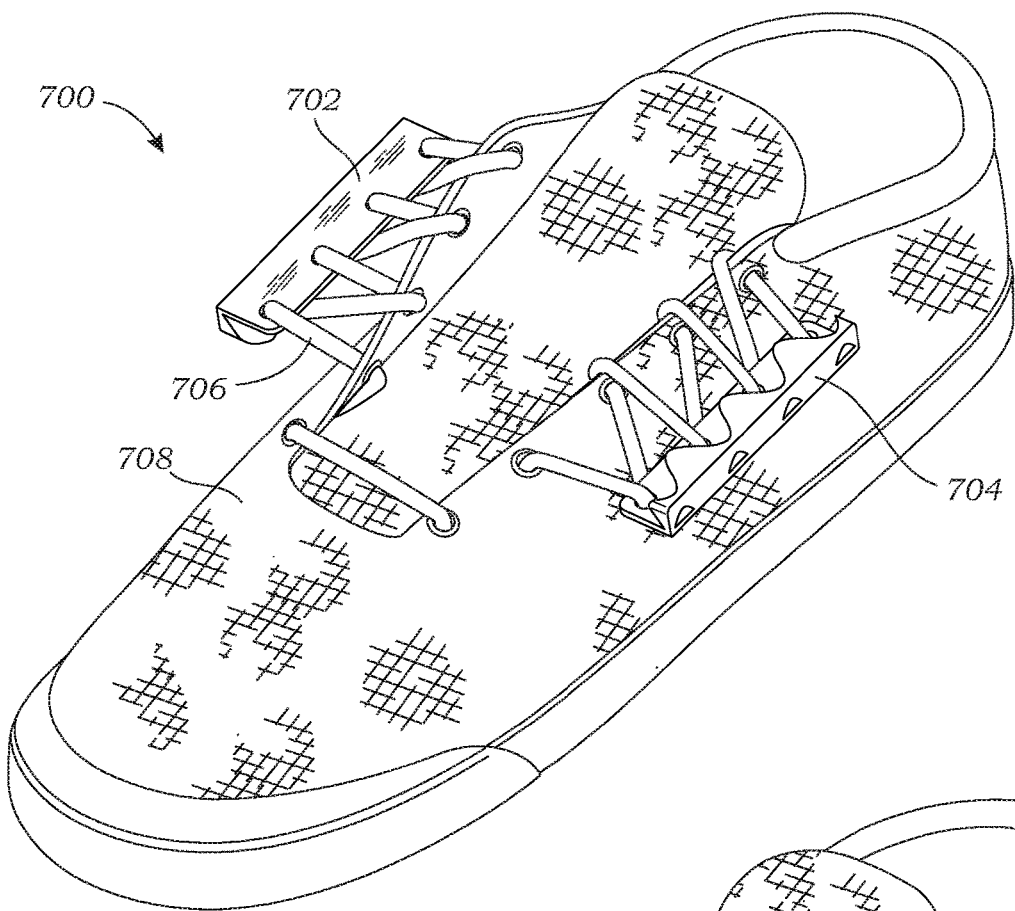
FIG. 7A is a perspective view of a shoe that includes an interconnecting fastening system in an open configuration.
Figure 7B:
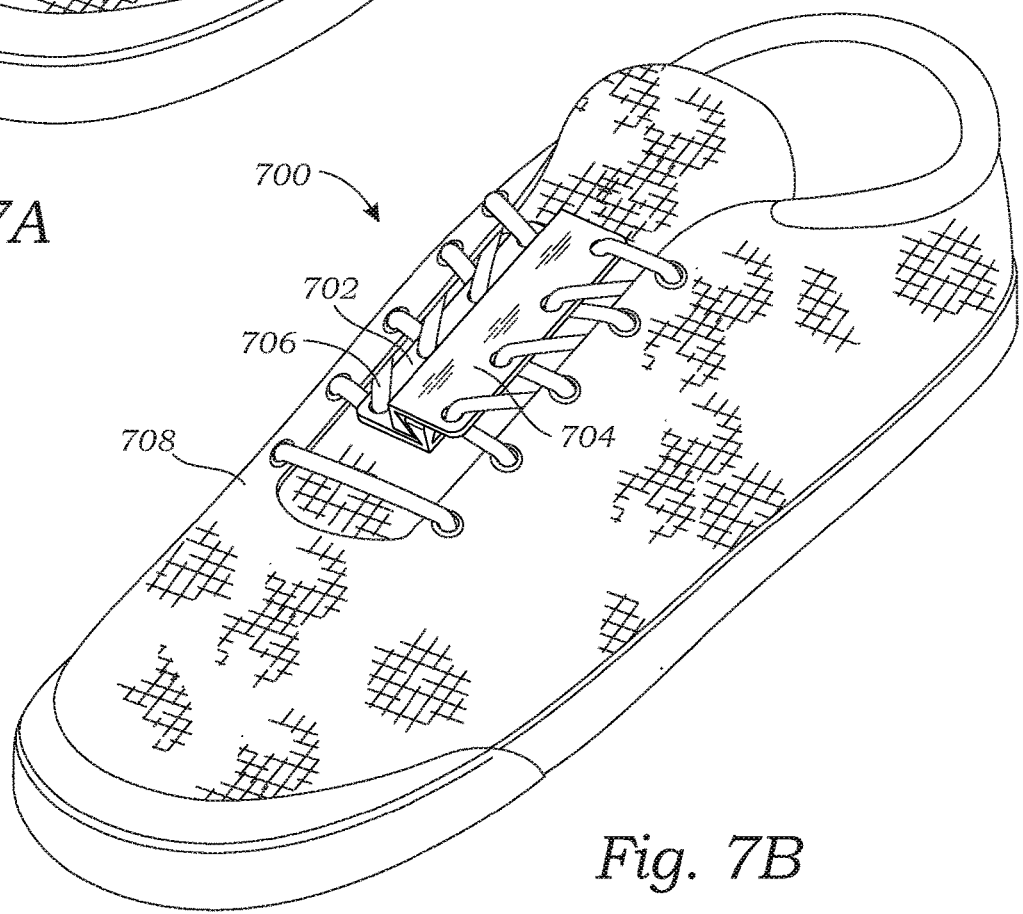
FIG. 7B is a perspective view of the shoe of FIG. 7A, illustrating the interconnecting fastening system in a locked configuration.

FIG. 7A is a perspective view of a shoe that includes an interlocking fastening device 700 in an open configuration. FIG. 7B is a perspective view of the shoe of FIG. 7A, illustrating the interlocking fastening device 700 in a locked configuration. As shown in FIGS. 7A and 7B, the device 700 includes first and second interlocking elements 702 and 704 as described above. In this embodiment, the elements 702 and 704 are attached to laces 706 of a shoe 708 so that the shoe laces 706 may be fastened by the interlocking fastening device 700.

Figure 8A:
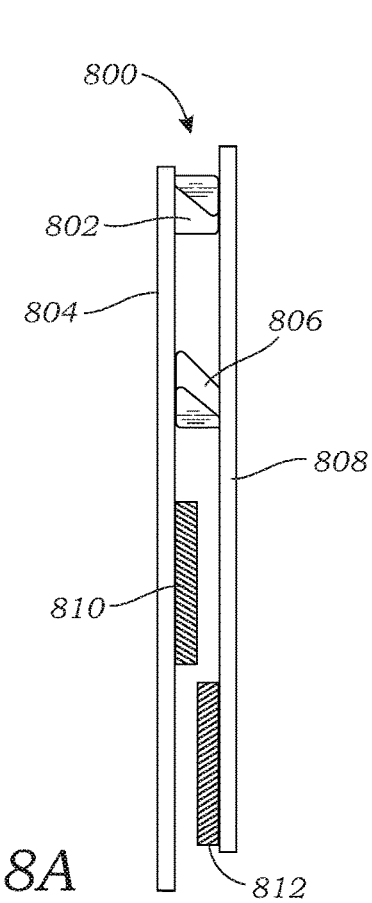
FIG. 8A is an exploded perspective view of another embodiment, of the interlocking fastening system that includes a second fastener.
Figure 8B:
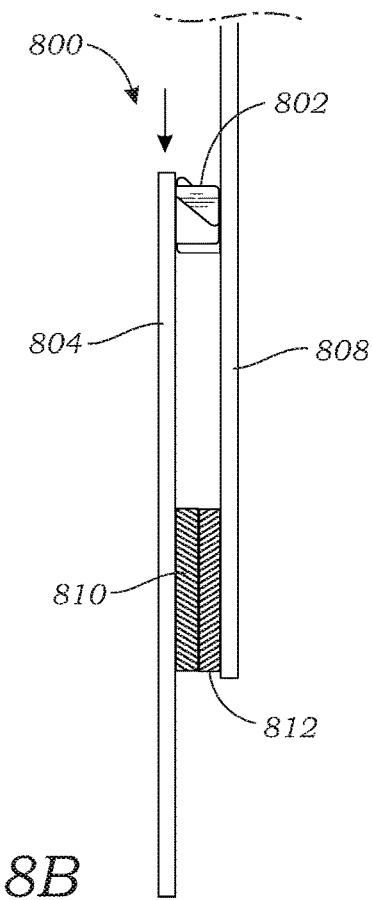
FIG. 8B is a perspective view of the embodiment of FIG. 8A, once the system has been interlocked.

FIG. 8A is an exploded perspective view of another embodiment of the interlocking fastening system 800 that includes a second fastener that functions to further hold the system 800 in a locked configuration and prevent accidental disengagement FIG. 8B is a perspective view of the embodiment of FIG. 8A once the system 800 has been interlocked. As shown in FIGS. 8A and 8B, a first interlocking portion 802 of the system 800 is attached to a first mounting plate 804, and a second interlocking portion 806 is mounted on a second mounting plate 808, similar to the structures described above. In this embodiment, a first fastener 810 is mounted on the first mounting plate 804 adjacent the first interlocking portion 802, and a second fastener 812 is mounted on the second mounting plate 808 adjacent the second interlocking portion 806. The first and second fasteners 810 and 812 interlock with each other to maintain the system 800 in the locked position and prevent accidental disengagement of the first and second interlocking portions 802 and 806. In this embodiment the first and second fasteners 810 and 812 are hooks and loops fasteners (i.e., Velcro), and they alternatively may be magnets and/or other suitable fasteners known in the art.

Figure 9:
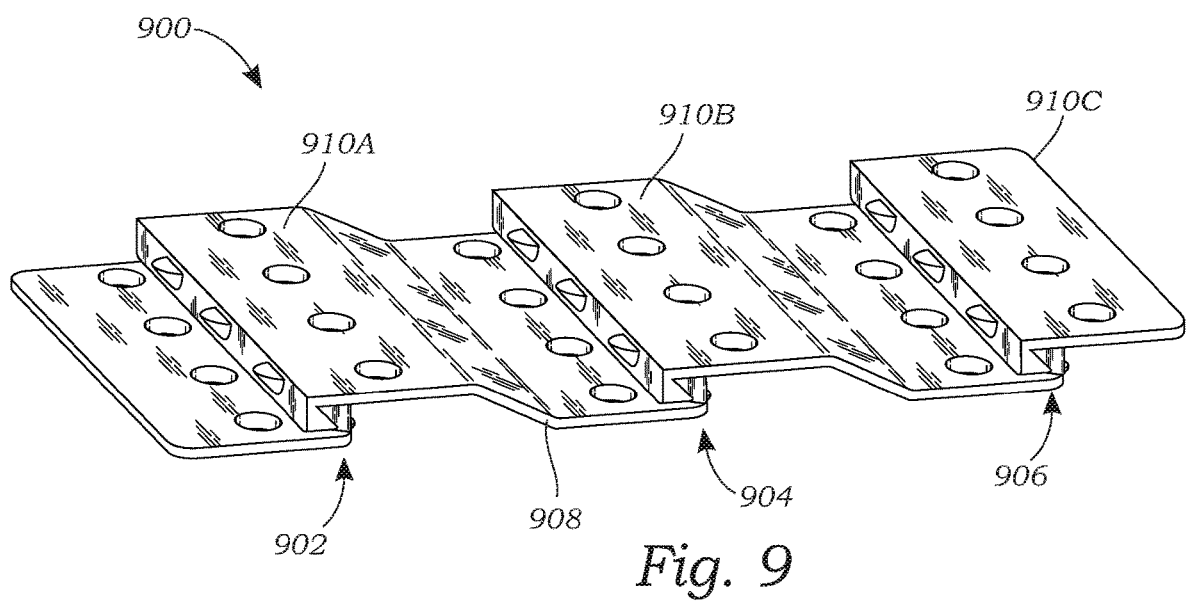
FIG. 9 is a perspective view of another embodiment of the fastening system that includes multiple interlocking features.

FIG. 9 is a perspective view of another embodiment 900 of the fastening system that includes multiple interlocking features 902, 904, and 906 (in this embodiment). In this embodiment, adjacent features 902 and 904 are connected by a single mounting plate 908, so that they daisy-chain together via different interlocking portions 910A, 910B, and 910C, in this embodiment.

Figure 10:
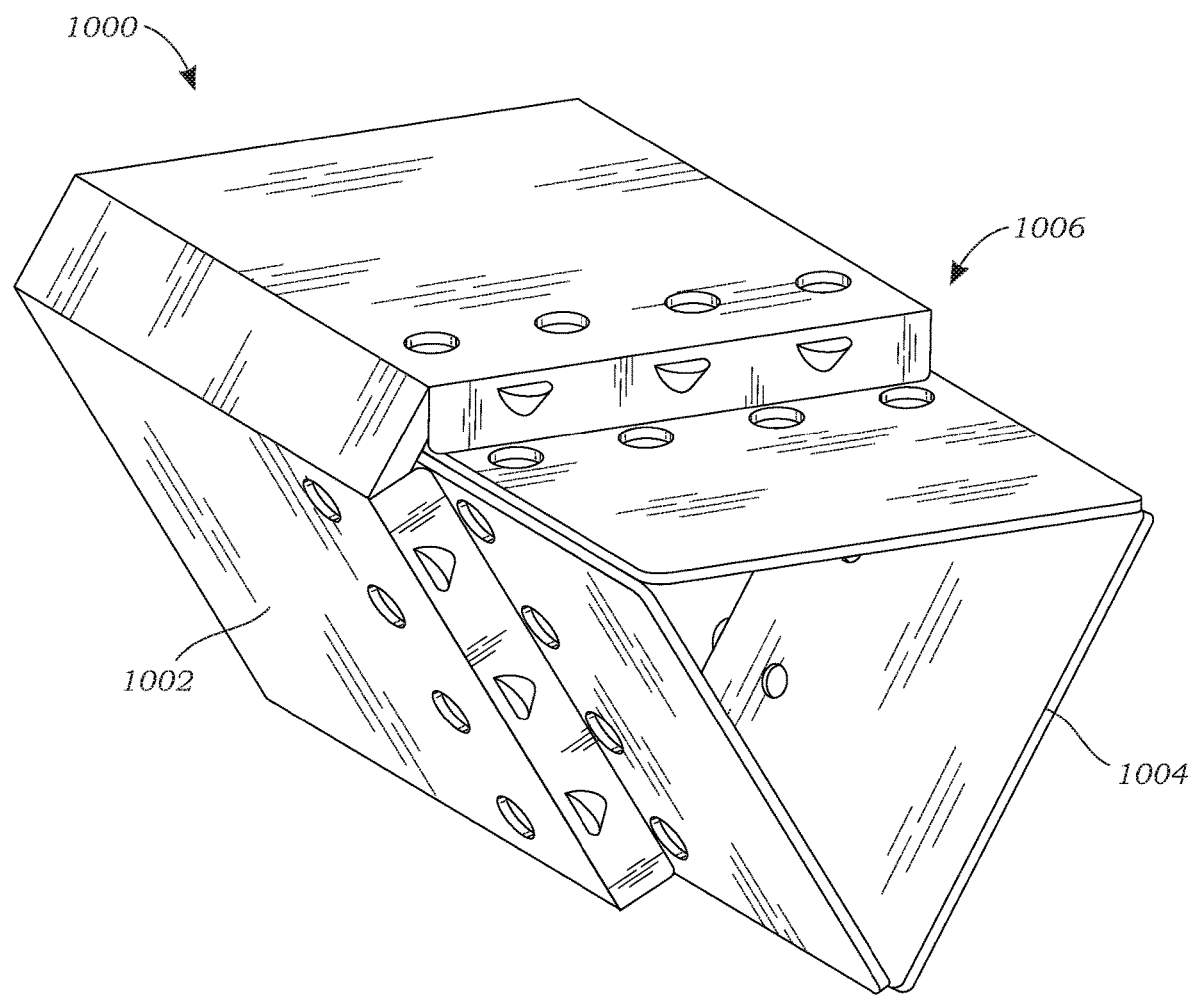
FIG. 10 is a perspective view of another embodiment of the fastening system that interlocks two components of a tubular structure.

FIG. 10 is a perspective view of another embodiment 1000 of the fastening system that interlocks two components of a tubular structure, a first tubular structure 1002 and a second tubular structure 1004. In this embodiment, the first and second tubular structures 1002 and 1004 have a triangular cross section and telescopically engage each other; however, other cross-sectional shapes could also be used (e.g., rectangular, polygonal, round, oval, etc.). As illustrated, the two components 1002 and 1004 slide towards an extended position until the locking components (discussed above in more detail) engage each other and prevent further movement.

Figure 11:
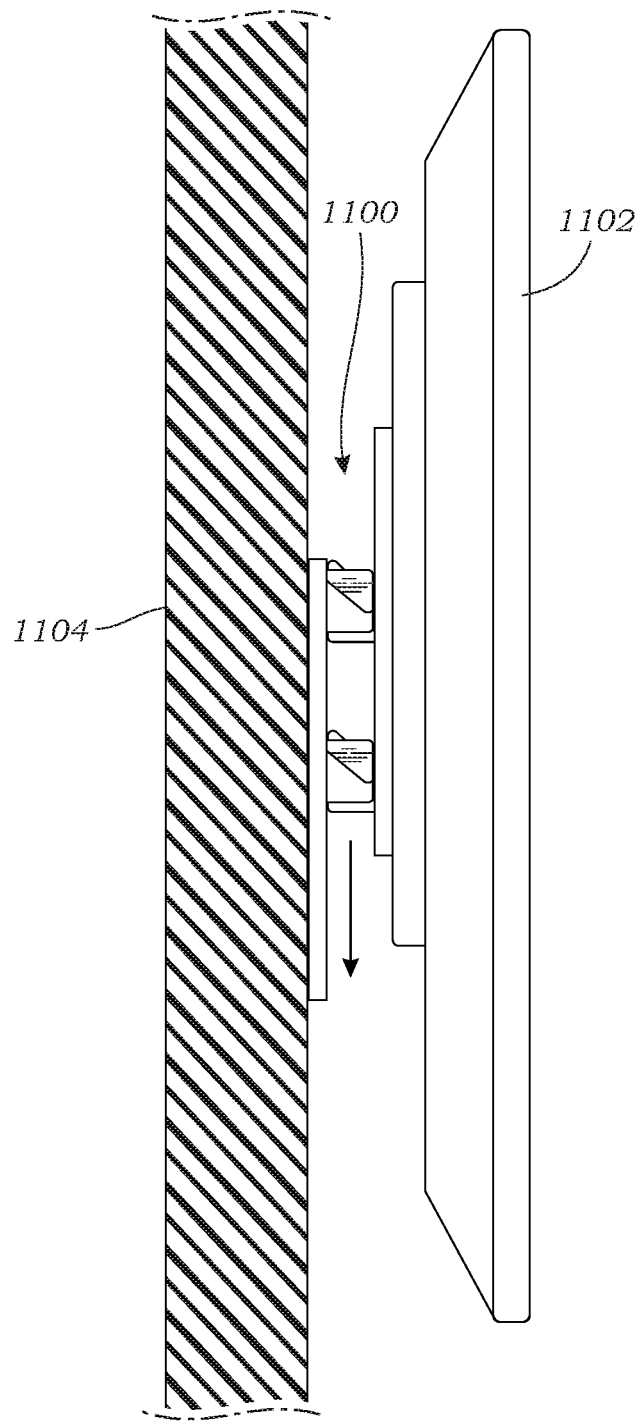
FIG. 11 is a side elevational view of another embodiment of the interlocking system being used to mount a flat screen television.

FIG. 11 is a side elevational view of another embodiment 1100 of the interlocking system being used to mount a flat screen television 1102 on a wall 1104.

Figure 12:
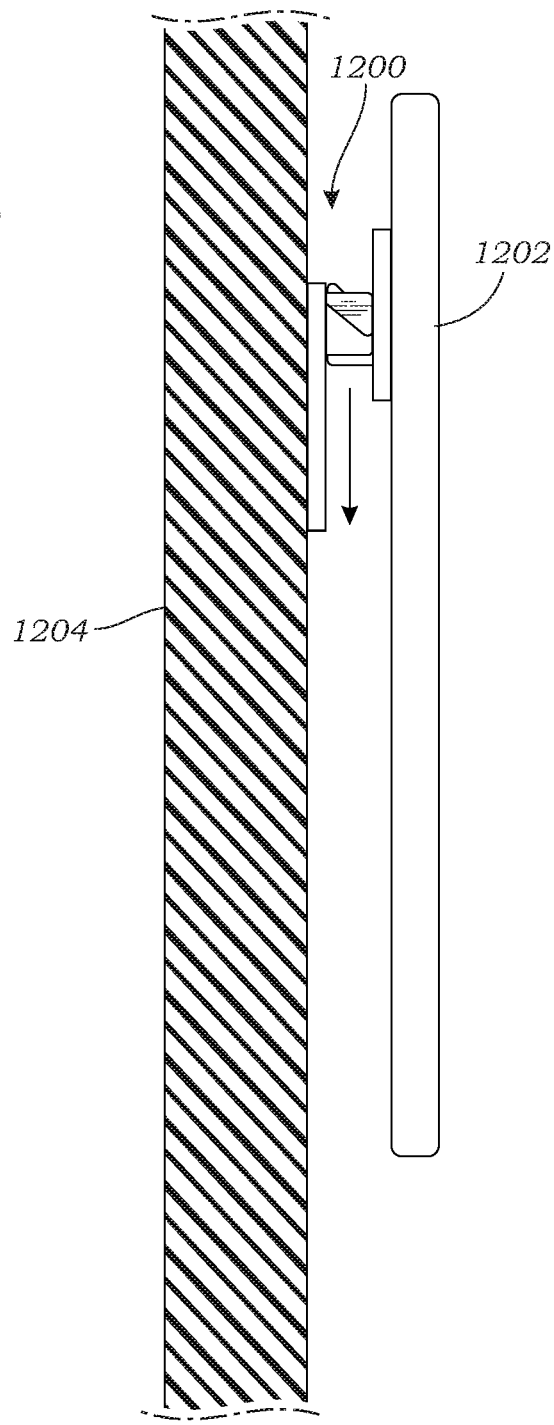
FIG. 12 is a side elevational view of another embodiment of the interlocking system being used to mount a framed article.

FIG. 12 is a side devotional view of another embodiment 1200 of the interlocking system being used to mount a framed article 1202 on a wall 1204.

While some embodiment of the uses of the above-described invention are illustrated, those skilled in the art may devise alternative embodiments of the invention for other uses, and such alternatives should be considered within the scope of the present invention. Reference throughout this specification to "one embodiment," "an embodiment," "one example," or "an example" means that a particular feature, structure, or characteristic described in connection with the embodiment or example is included in at least one embodiment or example of the present invention, but may be excluded in alternative embodiments. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top," "down," "above," and "below" are used with reference to the orientation of the figure(s) being described. Also, the terms "have," "include," "contain," and similar terms are defined to mean "comprising" unless specifically stated otherwise. The term "approximately" means plus or minus 10%. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An interlocking fastening device comprising:
   a first interlocking portion comprising:
      a first guide plate having a first surface;
      at least one structure extending upwardly from the first surface of the first guide plate; and
      a first curvilinear wave structure formed from the at least one structure tapering upwardly at an acute angle from the first surface of the first guide plate, the first curvilinear wave structure forming a plurality of first forward facing sidewalls that extend upwardly to a forward edge;
   a second interlocking portion comprising:
      a second guide plate having a second surface;
      at least one structure extending upwardly from the second surface of the second guide plate; and
      a second curvilinear wave structure formed from the at least one structure tapering upwardly at an acute angle from the second surface of the second guide plate, the second curvilinear wave structure forming a plurality of second forward facing sidewalls that extends upwardly to a forward edge;
   the first interlocking portion being configured so that the first curvilinear wave structure may be received in between and extend into the second curvilinear wave structure positioned on the second interlocking portion;
   the second interlocking portion being configured so that the second curvilinear wave structure may be received in between and extend into the first curvilinear wave structure positioned on the first interlocking portion;
   the plurality of first and second forward facing sidewalls being configured so that an application of a relative tension force to the first and second interlocking portions causes ones of the plurality of first forward facing sidewalls to slidingly engage corresponding respective ones of the plurality of second forward facing sidewalls until the plurality of first and second forward facing sidewalls engage sufficiently to block further relative movement in a direction of the relative tension force on the first and second interlocking portions; and
   wherein tips of the first curvilinear wave structure can extend through apertures of the second curvilinear wave structure.

2. The interlocking fastening device of claim 1 wherein the angles of the first and second curvilinear wave structures are each 30-60 degrees from their corresponding guide plates.

3. The interlocking fastening device of claim 1 wherein the angles of the first and second curvilinear wave structures are each approximately 45 degrees from their corresponding guide plates.

4. The interlocking fastening device of claim 1 wherein the angles of the first and second curvilinear wave structures are each 30-60 degrees from their corresponding guide plates, the angle between the wave structure formations and the guide plates creating a wedge that locks the opposing first and second interlocking portions into place when held under tension force on and within a plane of the first and second interlocking portions.

* * * * *